United States Patent [19]

Mausgrover et al.

[11] Patent Number: 5,409,673
[45] Date of Patent: Apr. 25, 1995

[54] OZONE GENERATOR HAVING AN ELECTRODE FORMED OF A MASS OF HELICAL WINDINGS AND ASSOCIATED METHOD

[75] Inventors: Robert H. Mausgrover; Dennis H. McEachern, both of Concord, N.C.

[73] Assignee: O'Three Limited, Concord, N.C.

[21] Appl. No.: 832,989

[22] Filed: Feb. 10, 1992

[51] Int. Cl.⁶ .............................................. C01B 13/11
[52] U.S. Cl. ......................... 422/186.07; 422/186.18; 422/907
[58] Field of Search ...................... 422/186.07, 186.18, 422/907

[56] References Cited

U.S. PATENT DOCUMENTS

| | | | |
|---|---|---|---|
| 565,952 | 8/1896 | Andreoli | 422/186.07 |
| 788,557 | 5/1905 | Sahlstrom | 422/186.07 |
| 935,457 | 9/1909 | Bridge | 422/186.07 |
| 1,437,760 | 12/1922 | Kuhlenschmidt | 422/186.07 |
| 2,155,675 | 4/1939 | Napier | 204/32 |
| 2,658,868 | 11/1953 | Collison | 204/320 |
| 2,822,327 | 2/1958 | Hammesfahr | 204/176 |
| 3,023,155 | 2/1962 | Castor | 204/320 |
| 3,215,616 | 11/1965 | Spielman | 204/313 |
| 3,309,304 | 3/1967 | Caplan | 204/313 |
| 3,457,160 | 7/1969 | Fortier | 204/319 |
| 3,530,058 | 9/1970 | Blanchard | 204/320 |
| 3,671,417 | 6/1972 | Louboutin | 204/320 |
| 3,739,440 | 6/1973 | Lund et al. | 29/25.13 |
| 3,865,733 | 2/1975 | Taylor | 250/532 |
| 3,967,131 | 6/1976 | Slipiec et al. | 250/539 |
| 4,035,657 | 7/1977 | Carlson | 250/533 |
| 4,062,748 | 12/1977 | Imris | 204/176 |
| 4,090,960 | 5/1978 | Cooper | 210/637 |
| 4,179,617 | 12/1979 | Tanaka et al. | 250/531 |
| 4,213,838 | 7/1980 | Lowther | 204/176 |
| 4,214,995 | 7/1980 | Saylor | 250/539 |
| 4,349,511 | 9/1982 | Owen | 422/186.07 |
| 4,351,734 | 9/1982 | Kauffman | 210/748 |
| 4,417,966 | 11/1983 | Krauss et al. | 204/176 |
| 4,614,573 | 9/1986 | Masuda | 204/176 |
| 4,737,885 | 4/1988 | Akutsu | 422/907 |
| 4,834,948 | 5/1989 | Schmiga et al. | 422/186.19 |
| 4,909,996 | 3/1990 | Uys | 422/186.07 |
| 5,087,428 | 2/1992 | Fletcher et al. | 422/186.07 |
| 5,102,629 | 4/1992 | Hayashi et al. | 422/186.18 |

FOREIGN PATENT DOCUMENTS

224861 8/1910 Germany.
2606731 1/1978 Germany.

*Primary Examiner*—Donald P. Walsh
*Assistant Examiner*—Daniel Jenkins
*Attorney, Agent, or Firm*—Bell, Seltzer, Park & Gibson

[57] ABSTRACT

An apparatus and method for producing a high concentration of ozone gas using an electrical corona discharge in the presence of an oxygen containing gas. The generator includes a first and second electrode separated by a dielectric tube, each electrode being adapted to be connected to a high voltage AC power supply. The first electrode preferably has a lattice structure and surrounds the dielectric tube. The second electrode is formed of a mass of helical windings with a series of curved surfaces thereon. The second electrode is positioned within the dielectric tube underlying the first electrode. The curved surfaces of the helical windings create a corona therefrom. In one embodiment of the ozone generator, the mass of helical windings is provided by at least one milled sponge having a plurality of layers of a continuous helical winding extending in a generally spiral direction about a central axis of the milled sponge. The mass of helical windings also facilitates the intermixing of the oxygen containing gas passing therethrough. The generator produces a high concentration of ozone and a small amount of waste heat, yet has a simple, reliable and rugged construction.

45 Claims, 3 Drawing Sheets

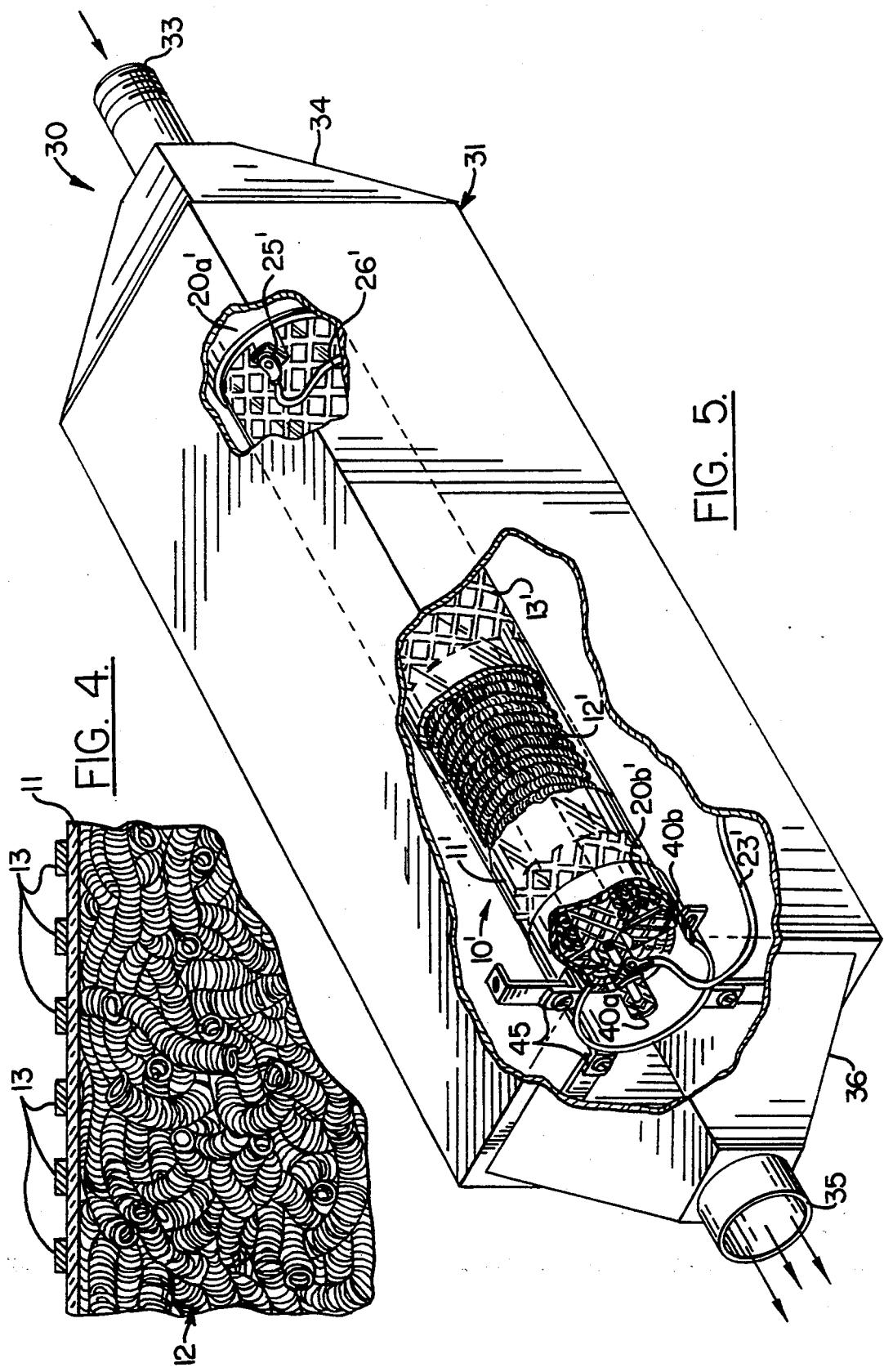

OZONE GENERATOR HAVING AN ELECTRODE FORMED OF A MASS OF HELICAL WINDINGS AND ASSOCIATED METHOD

FIELD OF THE INVENTION

This invention relates to the field of ozone generators, and more particularly, to an ozone generator for producing a high concentration of ozone gas from an electrical corona discharge and associated method.

BACKGROUND OF THE INVENTION

Ozone is one of the most powerful oxidizers and disinfectants available. Ozone not only kills bacteria, but also inactivates many viruses, cysts and spores. In addition, ozone oxidizes many organic chemical compounds, including chloramines, soaps, oils and other wastes thereby rendering them harmless to the environment. Accordingly, ozone may be used for a number of purposes including: drinking water purification, waste water treatment, air purification and sterilization, and a variety of medical uses.

Ozone is typically generated by one of two methods. Ultraviolet lamps operating at a wavelength of between 180–190 nanometers may be used to produce ozone in ambient air. Ozone may also be generated by creating an electrical corona discharge between two energized electrodes in ambient air or in another oxygen containing gas. The electrodes are typically separated by a dielectric material, such as a glass or an air gap separation may be provided. The corona discharge is an ionization of the air and is visually indicated by the presence of a pale violet or bluish color in the area between and surrounding the electrodes.

Because ozone has a half-life of only about 22 minutes in ambient air before dissociating back to oxygen, a process requiring ozone must have an ozone generator in close proximity to the desired point of application of the ozone. Thus, an ideal ozone generator is desirably compact, relatively simple in construction, consumes little electricity, and produces little waste heat while producing a high concentration of ozone.

The prior art has developed a number of ozone generators based on the electrical corona discharge process for producing ozone. A wide assortment of electrode configurations have been developed to try to improve the performance of the basic corona discharge ozone generator. For example, an ozone generator electrode formed from a planar wire mesh or screen is known in the art. For example, U.S. Pat. No. 2,658,868 to Collison discloses a cylindrical ozone generator wherein both the inner and outer electrodes are preferably constituted of concentrically disposed wire screens separated by a dielectric tube. Similarly, U.S. Pat. No. 4,035,657 to Carlson discloses an ozone generator having concentric electrodes formed from planar rectangular sheets of stainless steel wire mesh screen.

Two U.S. Patents to Bridge, U.S. Pat. Nos. 32,768 and 935,457, disclose a cylindrical surface electrode having openings therein permitting the flow of a gas through and transverse to the electrode. The Bridge patents teach various electrode surface configurations including a perforated tubular shape, a rectangularly perforated shape, and a wire mesh. U.S. Pat. No. 788,557 to Sahlstrom discloses planar or concentrically positioned electrodes separated by a dielectric, and the electrodes having either pointed raised portions or being formed of a wire gauze.

The prior art also includes ozone generator electrodes having raised portions on the electrode surface. For example, Saylor discloses, in U.S. Pat. No. 4,214,995, an ozone generator having a plurality of electrode sets, each set having a dimpled inner electrode in a sealed dielectric and surrounded by an outer electrode spaced from the inner electrode to permit a flow of air therebetween. U.S. Pat. No. 4,062,748 to Imris discloses a bipolar grid shaped electrode wherein the bipolar and discharge electrodes have surfaces with sawtooth or needle-shaped points.

Smooth or flat electrode surfaces are disclosed, for example, in U.S. Pat. Nos. 4,213,838 and 4,090,960 to Lowther and Cooper, respectively. The Lowther patent discloses a corona reaction chamber for producing ozone, wherein excess heat is carried away from the system by a gas flow therethrough, and wherein the electrodes are closely spaced flat plates. The Cooper patent discloses an apparatus for forming ozone and injecting it into a flow of liquid. The Cooper patent discloses two electrodes separated by a porous sheath filter whereby ozone generated from a tubular smooth inner electrode is passed through the sheath, as it is formed, and out into the liquid.

"Filled" electrodes for ozone generation are also known in the art wherein the electrode is formed of a mass of filling material. For example, Kuhlenschmidt, in U.S. Pat. No. 1,437,760, discloses an ozone generator having a concentric series of evacuated and sealed glass structures containing each electrode. Passageways between the glass structures permit fluid flow therethrough. The Kuhlenschmidt evacuated glass structure electrodes are filled with a material, such as loosely arrange metal chips, coarse metallic fillings and wire chips, interlacingly arranged pieces of wire gauze, or leaden shot having a spherical diameter of about one millimeter.

U.S. Pat. No. 4,351,734 to Kauffman discloses an ozone generator for treating a waste-bearing liquid by passing air through an electrode bed in the liquid. The Kauffman electrode bed consists of two mesh grids with a packing of aluminum shot therebetween. Castor, in U.S. Pat. No. 3,023,155, discloses a cylindrical ozone generator having an inner electrode consisting of a tube with passages for the flow of air therethrough and further surrounded by a mass of aluminum granules preferably of the order of fifty to twenty-five thousandths of an inch in size. The aluminum particles of the Castor electrode are each insulated from one another by the formation of an oxide coating thereon.

Other attempts have been made to modify the basic electrical corona discharge ozone generator to achieve greater ozone conversion efficiency and/or greater energy consumption efficiency. For example, U.S. Pat. No. 4,417,966 to Krauss et al. discloses an ozone generator having a glow discharge chamber in which an electrode is located and in which a gas, such as neon, is adapted to be ionized by an electric field produced by a voltage pulse at a frequency of from ten to sixteen KHz. Thus, in Krauss the entire glow discharge chamber functions as inner plasma electrode and the outer electrode has a net-like form. Masuda discloses, in U.S. Pat. No. 4,614,573, an ozone generator which first compresses then cools the oxygen containing gas before passing it between a pair of electrodes—the inner electrode formed of a series of linear electrodes on the inner surface of a cylindrical dielectric tube.

It is also known in the art to increase the concentration of oxygen in the gas subjected to the electrical corona discharge, or to cool the oxygen containing gas, to thereby increase ozone production efficiency. Ozone generators which require pure oxygen or supplemental cooling are likely to be relatively complicated and typically require frequent and expensive maintenance. To compensate for low conversion efficiency, a number of generators may also be configured in tandem to produce the required amount of ozone. Alternately, larger ozone generating units may be used to produce a required amount of ozone.

Despite the numerous beneficial applications for ozone, and despite repeated attempts in the prior art to produce an efficient ozone generator, a mechanically and electrically simple and rugged ozone generator has not heretofore been developed. The prior art ozone generators have typically produced a relatively large amount of excess heat and have failed to produce a high concentration of ozone.

SUMMARY OF THE INVENTION

It is therefore an object of the present invention to provide an ozone generator that efficiently produces a high concentration of ozone with little excess heat.

It is another object of the present invention to provide an ozone generator that is mechanically and electrically simple, and that is also rugged and reliable and requires minimum continuing maintenance.

It is a further object of the present invention to provide an ozone generator that is physically compact and which efficiently uses electrical energy.

These and other objects of the present invention are provided by an electrically powered ozone generator including a dielectric tube separating two electrodes adapted to be connected to a high voltage power supply, wherein the inner electrode is formed of a cohesive sponge-like mass of helical windings of electrically conductive material. The mass of helical windings occupies a portion of the interior of the dielectric tube underlying an outer electrode. The mass of helical windings is permeable to the flow of gas therethrough and has a series of curved surfaces thereon for creating an electrical corona. The electrical corona generates ozone in the presence of an oxygen containing gas, such as air.

The helical windings are preferably formed of strips of electrically conductive material and preferably have a radius of curvature of not more than about one quarter of an inch. The mass of helical windings may be provided by at least one milled sponge having a plurality of layers of at least one continuous helical winding extending in a generally spiral direction around the central axis of the milled sponge. Stainless steel is a preferred material for the milled sponge, since stainless steel is an electrical conductor and is resistant to chemical attack from ozone.

As would be readily understood by those skilled in the art, the corona discharge at the electrodes acts upon the oxygen molecules ($O_2$) to produce ozone ($O_3$). A compact high voltage electrical power supply for the electrodes may be provided, for example, by a commercially available neon light transformer. The transformer converts household power (120 VAC) to 9-12 KVAC to power the electrodes and create the electrical corona.

The dielectric tube of the ozone generator may preferably be formed of a dielectric material, such as borosilicate glass (Pyrex®), separating the inner and outer electrodes. The borosilicate glass is resistant to pinholing and dielectric breakdown when subjected to the high electric field strengths generated between the two electrodes. The dielectric tube has opposing open ends defining an inlet end and an outlet end. The inlet end permits the inflow of oxygen containing gas into the dielectric tube, and the outlet end permits the outflow of ozone from the tube.

An outer electrode surrounds the dielectric tube and preferably has an open lattice structure. The outer electrode is preferably formed of a material, such as stainless steel, that is resistant to chemical breakdown in the presence of ozone. A housing may be provided surrounding the outer electrode and communicating with the dielectric tube to capture the ozone gas generated by the outer electrode and the inner electrode.

In a first embodiment of the invention, the inner electrode fills the cross-sectional dimension of the dielectric tube underlying the outer electrode. The helical windings may also be randomly arranged to facilitate the intermixing of gas flowing through the inner electrode. Alternately, the mass of helical windings may be provided by one or more milled sponges, as described above, and positioned within the dielectric tube to define one or more layers of helical windings extending in a generally spiral orientation around the longitudinal axis of the dielectric tube.

An elongate conductor, such as a solid wire, is preferably positioned to extend through substantially the entire length of the inner electrode and in electrical contact with adjacent portions of the helical windings of the inner electrode. To support the wire, a pair of end collars are positioned on opposite ends of the tube with respective transverse extending rods connected thereto. The wire is secured to the transverse rods. The end collars also serve to define an inlet and an outlet, respectively, for gas flowing through the dielectric tube. The wire is connected to a terminal of the high voltage electrical power supply.

In a second embodiment of the invention, a hollow spacer extends longitudinally in the interior of the dielectric tube. The hollow spacer has an inlet to permit a flow of oxygen containing gas into the interior of the spacer and the spacer is permeable to further permit the flow of an oxygen containing gas into the inner electrode. The spacer preferably has a tubular shape and is formed of stainless steel lattice material, such as that used for the outer electrode. The inner electrode is positioned between the spacer and the dielectric tube. Thus, the hollow spacer acts as a centrally positioned elongate conductor, as well as permits gas to flow into the inner electrode to thereby more efficiently cool the inner electrode.

In preliminary testing, the ozone generator according to the present invention produces a high concentration of ozone while generating little excess heat in comparison to prior art ozone generators. Applicants theorize, without wishing to be bound thereto, that the mass of helical windings has greater ionization efficiency than prior art electrode configurations because the electrical corona is also generated from the series of curved surfaces of the helical windings extending into the interior of the mass according to the present invention, rather than being confined to an outer electrode surface as in many of the prior art ozone generators. Mixing of the flow of gas through the mass of helical windings of the inner electrode may also contribute to more uniform and efficient production of ozone for the present invention.

The method for generating ozone according to the invention includes the steps of: providing a first and second electrode separated by a dielectric material, wherein the second electrode comprises a cohesive sponge-like mass of helical windings as described above; electrically energizing the two electrodes; and passing a flow of oxygen containing gas through the mass of helical windings. To increase efficiency, the temperature of the output flow from the generator is preferably maintained at a temperature of not greater than 80° F., such as by controlling the flow rate or the temperature of the input gas. The input flow is preferably maintained at a temperature of less than about 50° F. and has a relative humidity of not more than about 25 percent.

The method of making the ozone generator according to the invention includes positioning a cohesive sponge-like mass of helical windings of electrically conductive material in the interior of the dielectric tube to form the inner electrode. For the embodiment of the ozone generator including the hollow spacer, at least one milled sponge may be expanded outwardly from the central axis to create an opening through the sponge. Then the sponge may be positioned over the spacer and released. The elastic nature of the milled sponge causes the sponge to contract and securely surround the spacer.

BRIEF DESCRIPTION OF THE DRAWINGS

FIG. 4 is a greatly enlarged cross-sectional view of a portion of the mass of helical windings of the ozone generator along lines 4—4 in FIG. 3.

FIG. 5 is a fragmentary perspective view of a second embodiment of an ozone generator according to the present invention.

DETAILED DESCRIPTION OF THE PREFERRED EMBODIMENTS

Figure 1:
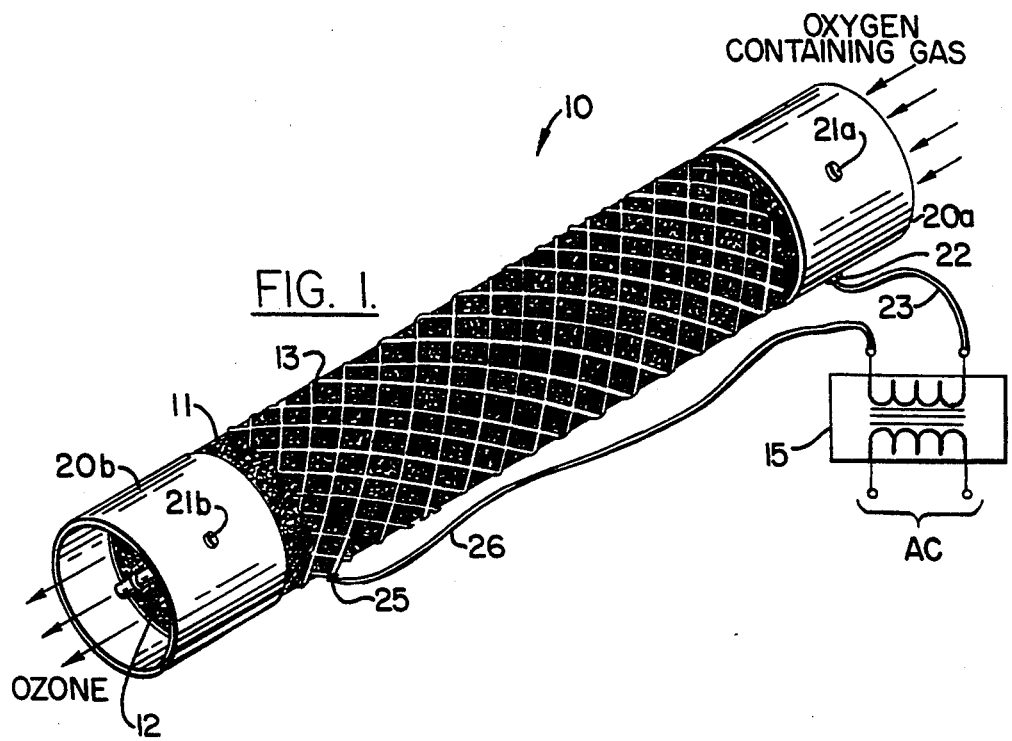
FIG. 1 is a perspective view of a first embodiment of an ozone generator according to the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Prime notation is used to indicate similar elements in alternate embodiments of the invention.

Referring to FIGS. 1-4, there is shown a first embodiment of an ozone generator according to the present invention generally designated by reference numeral 10. The ozone generator 10 includes a dielectric tube 11 that separates the inner electrode 12 and the outer electrode 13. The dielectric tube 11 is preferably borosilicate glass, such as commonly available under the trademark PYREX ®. The borosilicate glass has a high dielectric strength and is resistant to pinholing damage caused by the strong electric fields created between the inner electrode 12 and the outer electrode 13 when the electrodes are powered.

The dielectric tube 11 may typically have about a 3 inch diameter and have a length of about 16 inches. In the illustrated embodiment, the dielectric tube 11 is shown as a cylinder having a circular cross-section; however, it would be readily understood to those having skill in the art that the tube 11 may have other cross-sectional shapes as well.

The inner electrode 12 and outer electrode 13 are connected to a high voltage electrical power supply 15, such as a conventional neon light transformer. The transformer converts 120 VAC power into 9-12 KVAC to power the electrodes 12, 13 and create the electrical corona.

As best Shown in the greatly enlarged view of FIG. 4, the inner electrode 12 comprises a cohesive sponge-like mass of helical windings which extends lengthwise in the interior of the dielectric tube 11 underlying the outer electrode 13. In the illustrated embodiment, the inner electrode 12 also fills the cross-sectional dimension of the dielectric tube 11. The helical windings in the mass thereof may be randomly arranged in the dielectric tube 11 as shown in the illustrated embodiment. The random arrangement and structure of the helical windings facilitate the intermixing of an oxygen containing gas passing through the inner electrode 12. The intermixing of the gas passing through the inner electrode 12 is theorized to enhance the formation of ozone while carrying away any small amounts of waste heat generated therein.

The helical windings are preferably helically wound strips or turns of electrically conductive material, such as stainless steel, which is resistant to chemical attack from ozone. The mass of helical windings forming the inner electrode 12 may preferably be provided by one or more milled sponges of electrically conductive material. The milled sponge has a plurality of layers of at least one continuous helical winding extending in a generally spiral direction about a central axis of the milled sponge. Several of the milled sponges may be packed into a typical dielectric tube 11 having the dimensions as provided above.

The radius of curvature of the helical windings is preferably in the range of about one-sixteenth to one-eighth of an inch, and preferably no more than about one-quarter of an inch. It is theorized that the formation of the inner electrode 12 of the mass of helical windings with the series of curved surfaces thereon has greater ionization efficiency than prior art electrodes because the electrical corona is also generated from a large number of points extending into the interior of the mass, rather than being confined strictly to an outer surface portion as in typical prior art ozone generators.

The inner electrode 12 may preferably include a wire 18, or other elongate electrical conductor, extending lengthwise therethrough. The wire 18 may preferably be positioned along the axis of the dielectric tube 11 in contact with adjacent portions of the mass of helical windings of the inner electrode 12. The wire 18 extends substantially along the entire length of the inner electrode 12 and it is theorized by applicants, without their wishing to be bound thereto, that the wire 18 serves to distribute the electrical power more uniformly within the mass of helical windings forming the inner electrode 12. The wire 18 is connected to one terminal of a high voltage electrical power supply 15 as shown in FIG. 1.

A pair of end collars 20a, 20b may be provided at the opposing open ends of the dielectric tube 11. The end collars 20a, 20b may be sections of chlorinated polyvinyl chloride (PVC) tubing which is resistant to chemical attack from ozone. The end collars 20a, 20b have an inner diameter which closely matches the outer diameter of the dielectric tube 11 to thereby fit thereover. The end collars 20a, 20b define inlet and outlet openings, respectively, for the ozone generator 10. The inlet permits the inflow of an oxygen containing gas, such as air, into the dielectric tube 11 and the outlet permits the outflow of ozone from the dielectric tube 11.

Figure 3:
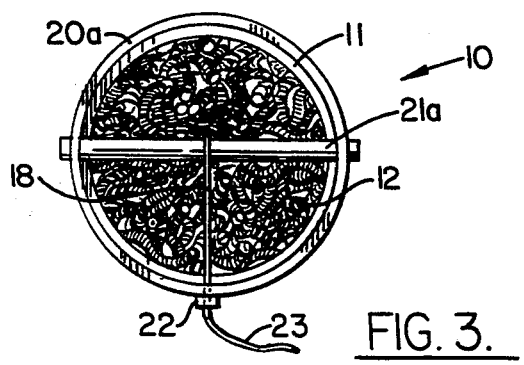
FIG. 3 is a end view of the ozone generator along lines 3—3 in FIG. 2.
Figure 2:
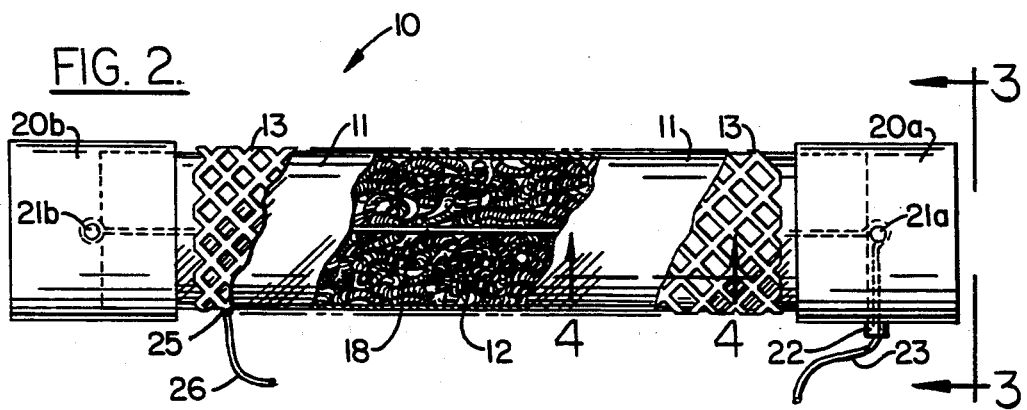
FIG. 2 is a fragmentary side elevational view of the ozone generator as shown in FIG. 1.

As shown in the end view of FIG. 3, the end collars 20a, 20b include respective transversely extending supporting rods or dowels 21a, 21b for supporting the wire 18 which extends through the helical windings of the inner electrode 12. The wire 18 may be extended to an outer radial point on an end collar 20a for connection at a crimp connection point 22 to a suitable insulated conductor 23. The insulated conductor 23 electrically connects the inner electrode 12 to the high voltage electrical power supply 15.

The outer electrode 13 is preferably formed in an open lattice structure, that is formed from an expanded metal sheet, as shown in the illustrated embodiment. The outer electrode 13 may be stainless steel which is resistant to chemical attack from ozone. The outer electrode 13 includes a connection point 25 to which an insulated conductor 26 may be connected. The insulated conductor 26 connects the outer electrode 13 to the high voltage electrical power supply 15.

Referring to FIG. 5, there is shown an ozone generating apparatus 30 according to the invention including a housing 31 surrounding a second embodiment of an ozone generator 10'. The housing 31 includes an inlet 33 for communication, with a flow of an oxygen containing gas and an outlet 35 for the ozone generated by the ozone generator 10' positioned in the interior of the housing. The housing 31 includes flared end portions 34, 36, respectively, adjacent the inlet 33 and outlet 35. The housing 31 also serves to protect personnel from the relatively high electrical voltage at the outer electrode 13' of the ozone generator 10'.

The housing 31 serves to collect ozone generated by the outer electrode 13'. In addition, the ozone generator 10' is positioned in spaced apart relation from the inlet 33 and outlet 35 of the housing by a series of brackets 45 or other securing means, so that the housing is in communication with the interior of the dielectric tube 11' to thereby collect ozone generated by the inner electrode 12'. The spacing and relative dimensions of the ozone generator 10' and the housing 31 may be selected to provide a desired relative proportion of gas flow through the inner electrode 12' and over the outer electrode 13'.

As would be readily understood by those skilled in the art, the flow of gas through the ozone generating apparatus 30 may be achieved by applying positive pressure at the inlet 33, negative pressure at the outlet 35, or a combination of both. Accordingly, one or more fans may be coupled to the ozone generating apparatus 30 in a conventional manner, or the outlet may be coupled to a venturi, not shown, for delivering the ozone gas into a liquid.

It has been found that maintaining the temperature of the ozone gas at the outlet 35 below about 80° F. increases ozone yield, since high temperatures may cause dissociation of ozone back into oxygen. The temperature of the flow of oxygen containing gas at the inlet 33 may thus desirably maintained below about 50° F. and the relative humidity below about 25% to achieve greater efficiency for the illustrated embodiment.

Figure 7:
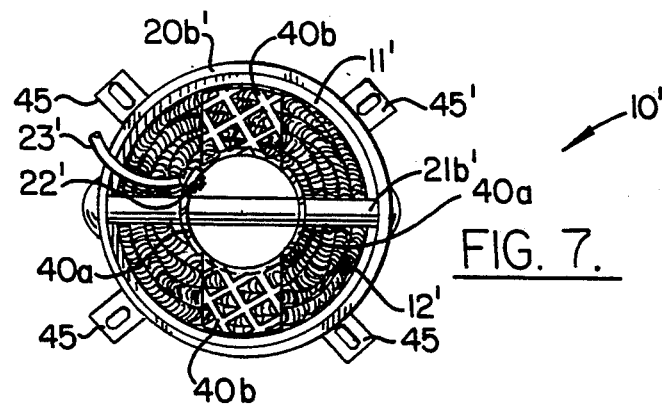
FIG. 7 is a end view of the ozone generator along lines 7—7 in FIG. 6.
Figure 6:
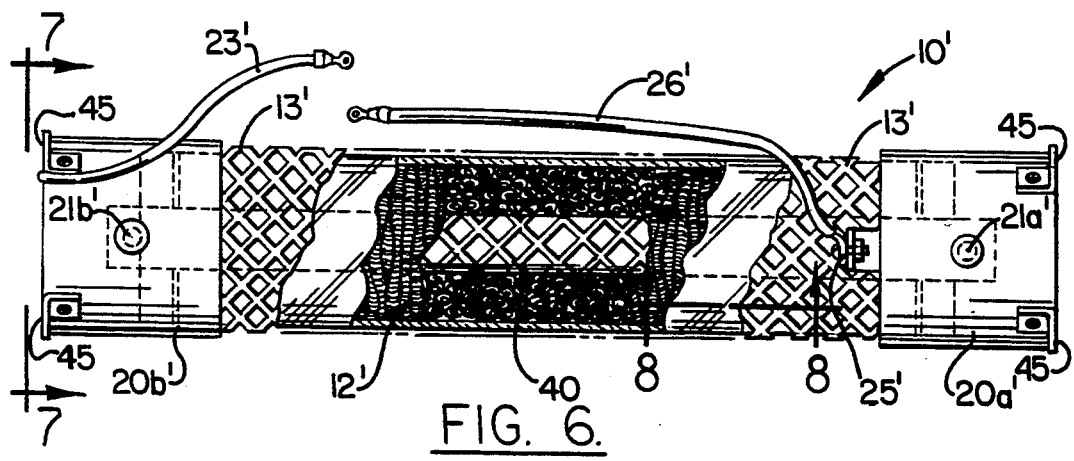
FIG. 6 is a fragmentary side elevational view of the ozone generator as shown in FIG. 5.
Figure 8:
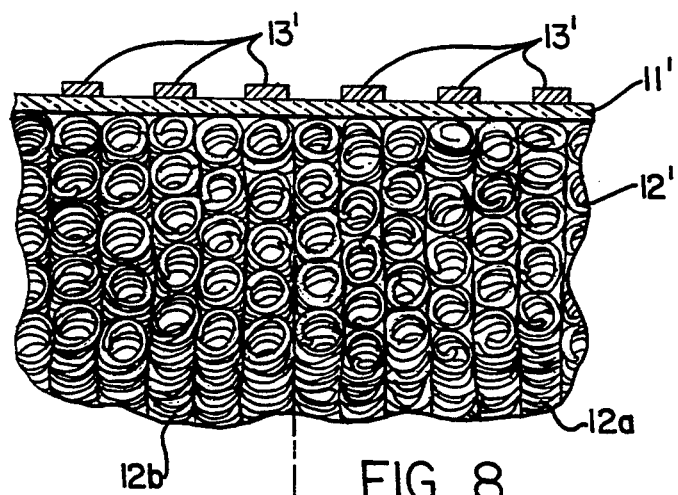
FIG. 8 is a greatly enlarged cross-sectional view of a portion of the mass of helical windings of the ozone generator along lines 8—8 in FIG. 7.

Referring to FIGS. 6–8, the second embodiment of the ozone generator 10' is shown in greater detail with the housing 31 removed. The ozone generator 10' includes a hollow spacer 40 which is positioned extending longitudinally in the interior of the dielectric tube 11'. The spacer 40 is preferably tubularly shaped and is positioned coaxially within the dielectric tube 11'. The open end of the spacer 40 adjacent the housing inlet 33 (FIG. 5) defines an inlet for the spacer. The spacer 40 is also permeable to the flow of gas therethrough and is preferably formed having a lattice structure as is the outer electrode 13'.

The spacer 40 is electrically conductive and is believed to more effectively distribute electrical power to the inner electrode 12'. The spacer 40 is also preferably formed of a stainless steel or other material that is resistant to chemical attack from ozone. The spacer 40 is electrically connected to a source of high voltage electrical power by a connection point 22' and an insulated conductor 23' as described above with reference to the first embodiment of the ozone generator according to the invention.

The inner electrode 12' is formed of a cohesive sponge-like mass of helical windings of electrically conductive material having a series of curved surfaces thereon for generating an electrical corona as described above. In the illustrated embodiment, the mass of helical windings is provided by a series of milled sponges positioned between the spacer and the dielectric tube 11'. FIG. 8 is a greatly enlarged view showing two adjacent sponges 12a, 12b positioned in contacting relation within the dielectric tube 11'. The milled sponges may preferably be arranged so that the inner electrode 12' is formed by multiple layers of helical windings extending in a generally spiral direction around the spacer 40 as best illustrated in the end view of FIG. 7 and the greatly enlarged view of FIG. 8.

According to an aspect for the method for making the ozone generator of the present invention, each milled sponge may be expanded along its central axis to form an opening therethrough to permit insertion of the spacer 40 into the opening. The elasticity of the milled sponge as an entity will cause the sponge to contract around the spacer 40 when released and thereby be securely fitted to the spacer.

To further ensure retention of the milled sponges within the dielectric tube 11', the spacer 40 may have each opposing end portion formed as shown best in the perspective view of FIG. 5 and the end view of FIG. 6. The spacer 40 is first longitudinally cut inwardly at an end thereof to form four substantially equal spacer end portions. A first pair of opposing spacer end portions 40a serves to mount the spacer 40 within the end collar 20b' on the transversely extending rod 21b' supported by the end collar 20b' as shown. The second pair of opposing spacer end portions 40b are folded outwardly to extend radially from the spacer 40 to the inner surface of the dielectric tube 11', thereby forming an end stop to further ensure retention of the milled sponges within the dielectric tube 11'.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An apparatus for generating ozone from an electrical corona in an oxygen containing gas, said apparatus comprising:
a dielectric tube;
an outer electrode overlying a portion of said dielectric tube; and
an inner electrode positioned in the interior of said dielectric tube and occupying a lengthwise portion thereof underlying said outer electrode, said inner electrode comprising a plurality of helical windings arranged in a cohesive sponge-like mass so as to be permeable to a flow of gas therethrough, each of said helical windings comprising an electrically conductive material, said helical windings having a series of curved surfaces thereon for creating an electrical corona therefrom so as to produce ozone from an oxygen containing gas passing through said cohesive sponge-like mass of helical windings.

2. The apparatus according to claim 1 wherein said inner electrode fills the interior cross-section of said dielectric tube.

3. The apparatus according to claim 1 wherein said inner electrode substantially fills the interior lengthwise extent of said dielectric tube.

4. The apparatus according to claim 1 wherein said helical windings are randomly arranged in said mass thereof, and wherein said helical windings and the random arrangement thereof facilitate intermixing of gas flowing therethrough.

5. The apparatus according to claim 1 wherein said mass of helical windings comprises at least one milled sponge having a plurality of layers of at least one continuous helical winding extending in a generally spiral direction about a central axis of said milled sponge.

6. The apparatus according to claim 1 further comprising an elongate electrical conductor extending through substantially the entire length of said inner electrode and positioned in electrical contact with adjacent portions of said helical windings.

7. The apparatus according to claim 6 wherein said dielectric tube has opposing open ends defining an inlet end and an outlet end thereof; wherein said inlet end permits the inflow of an oxygen containing gas into said dielectric tube and into said cohesive sponge-like mass of helical windings; and wherein said outlet end permits the outflow of ozone gas from said dielectric tube.

8. The apparatus according to claim 7 further comprising a pair of end collars positioned on respective ends of said dielectric tube; and means carried by said end collars for supporting said elongate electrical conductor in the interior of said dielectric tube.

9. The apparatus according to claim 8 wherein said means for supporting said elongate electrical conductor comprises a respective rod transversely connected to each end collar on said dielectric tube.

10. The apparatus according to claim 1 further comprising a housing surrounding said outer electrode for collecting ozone gas generated by said outer electrode.

11. The apparatus according to claim 1 further comprising a housing surrounding said outer electrode and communicating with said dielectric tube for collecting ozone gas generated by said outer electrode and said inner electrode.

12. The apparatus according to claim 1 wherein said helical windings are formed of strip material.

13. The apparatus according to claim 1 wherein the radius of curvature of each of said helical windings is not more than about one quarter of an inch.

14. The apparatus according to claim 1 wherein said dielectric tube comprises borosilicate glass.

15. The apparatus according to claim 1 wherein said outer electrode has an open lattice structure.

16. An apparatus for generating ozone from an electrical corona in an oxygen containing gas, said apparatus comprising:
a dielectric tube;
an outer electrode overlying a portion of said dielectric tube;
a hollow spacer extending longitudinally in the interior of said dielectric tube and underling said outer electrode, said spacer having an inlet to permit a flow of gas into the interior of said spacer, said spacer being permeable to a flow of gas therethrough; and
an inner electrode positioned in the interior of said dielectric tube and occupying a portion thereof between said dielectric tube and said spacer, said inner electrode comprising a plurality of helical windings arranged in a cohesive sponge-like mass so as to be permeable to a flow of gas therethrough, each of said helical windings comprising an electrically conductive material, said helical windings having a series of curved surfaces thereon for creating an electrical corona therefrom so as to produce ozone from an oxygen containing gas passing through said cohesive sponge-like mass of helical windings.

17. The apparatus according to claim 16 wherein said spacer comprises an electrically conductive material positioned in electrical contact with adjacent portions of said mass of helical windings.

18. The apparatus according to claim 16 wherein said spacer is tubularly shaped.

19. The apparatus according to claim 16 wherein said spacer has an open lattice structure.

20. The apparatus according to claim 16 wherein said helical windings are randomly arranged in said mass thereof; and wherein said helical windings and the random arrangement thereof facilitate intermixing of gas flowing therethrough.

21. The apparatus according to claim 16 wherein said mass of helical windings comprises at least one milled sponge having a plurality of layers of at least one continuous helical winding extending in a generally spiral direction about a central axis of said milled sponge.

22. The apparatus according to claim 16 wherein said helical windings are formed of strip material.

23. The apparatus according to claim 16 wherein the radius of curvature of each of said helical windings is not more than about one quarter of an inch.

24. The apparatus according to claim 16 wherein said dielectric tube has opposing open ends defining an inlet end and an outlet end thereof; wherein said inlet end permits the inflow of an oxygen containing gas into said dielectric tube and into said cohesive sponge-like mass of helical windings; and wherein said outlet end permits the outflow of ozone gas from said dielectric tube.

25. The apparatus according to claim 24 further comprising a pair of end collars positioned on respective ends of said dielectric tube; and means carried by said end collars for supporting said spacer in the interior of said dielectric tube.

26. The apparatus according to claim 25 wherein said means for supporting said spacer comprises a respective rod transversely connected to each end collar on said dielectric tube.

27. The apparatus according to claim 16 further comprising a housing surrounding said outer electrode for collecting ozone gas generated by said outer electrode.

28. The apparatus according to claim 16 further comprising a housing surrounding said outer electrode and communicating with said dielectric tube for collecting ozone gas generated by said outer electrode and said inner electrode.

29. The apparatus according to claim 16 wherein said dielectric tube comprises borosilicate glass.

30. The apparatus according to claim 16 wherein said outer electrode has an open lattice structure.

31. An apparatus for generating ozone from an electrical corona in an oxygen containing gas, said apparatus comprising:
  a first electrode;
  a second electrode positioned opposite and in spaced apart relation from said first electrode; and
  dielectric material positioned between said first and second electrodes;
  said second electrode comprising a plurality of helical windings arranged in a cohesive sponge-like mass so as to be permeable to a flow of gas therethrough, each of said helical windings comprising an electrically conductive material, said helical windings having a series of curved surfaces thereon for creating an electrical corona therefrom so as to produce ozone from an oxygen containing gas.

32. The apparatus according to claim 31 wherein said dielectric material comprises borosilicate glass.

33. The apparatus according to claim 31 wherein said helical windings are randomly arranged in said mass thereof, and wherein said helical windings and the random arrangement thereof facilitate intermixing of gas flowing therethrough.

34. The apparatus according to claim 31 wherein said mass of helical windings comprises at least one milled sponge having a plurality of layers of at least one continuous helical winding extending in a generally spiral direction about a central axis of said milled sponge.

35. The apparatus according to claim 31 wherein said helical windings are formed of strip material.

36. The apparatus according to claim 31 wherein the radius of curvature of each of said helical windings is not more than about one quarter of an inch.

37. The apparatus according to claim 31 wherein said first electrode has an open lattice structure.

38. A method for generating ozone from an oxygen containing gas comprising the steps of:
  providing a first electrode and a second electrode separated by a dielectric material, the second electrode comprising a plurality of helical windings arranged in a cohesive sponge-like mass so as to be permeable to a flow of gas therethrough, each of the helical windings defining a series of curved surfaces and comprising an electrically conductive material;
  energizing the first and second electrodes with electrical power to generate an electrical corona from the series of curved surfaces of the mass of helical windings of the second electrode; and
  passing an input flow of an oxygen containing gas into the cohesive sponge-like mass of helical windings of the second electrode so as to generate an output gas flow therefrom containing ozone.

39. The method according to claim 38 further comprising the step of maintaining the temperature of the output gas flow at a temperature of not greater than about 80° F. to thereby reduce the dissociation of ozone in the output gas flow.

40. The method according to claim 38 further comprising the step of maintaining the temperature of the input flow of the oxygen containing gas at a temperature of not greater than about 50° F. to thereby reduce the dissociation of ozone in the output gas flow.

41. The method according to claim 38 further comprising the step of maintaining the humidity of the output gas flow at a relative humidity of not greater than about 25 percent.

42. The method according to claim 38 further comprising the step of passing a portion of the input flow of oxygen containing gas over the first electrode to generate ozone gas therefrom.

43. A method for making an ozone generator including a dielectric tube, an outer electrode surrounding the dielectric tube, and an inner electrode in an interior of the dielectric tube, said method comprising the step of positioning a cohesive sponge-like mass of helical windings of electrically conductive material in the interior of the dielectric tube to form the inner electrode.

44. The method according to claim 43 wherein the step of positioning a mass of helical windings in the interior of the dielectric tube comprises the steps of positioning in the interior of the dielectric tube at least one milled sponge having a plurality of layers of at least one continuous helical winding extending in a generally spiral direction about a central axis of the milled sponge.

45. The method according to claim 44 further comprising the step of positioning a hollow tubular spacer longitudinally extending in the interior of the dielectric tube; and wherein the step of positioning the at least one milled sponge in the interior of the dielectric tube comprises the step of expanding the at least one milled sponge to form an opening along the central axis thereof and positioning the hollow tubular spacer within the opening of the milled sponge.

* * * * *